(12) United States Patent
Johannessen et al.

(10) Patent No.: US 10,616,463 B2
(45) Date of Patent: Apr. 7, 2020

(54) SYNCHRONIZED CAMERA AND LIGHTING SYSTEM

(71) Applicant: Rockwell Collins, Inc., Cedar Rapids, IA (US)

(72) Inventors: Eric Johannessen, Holbrook, NY (US); Jefferey M. McKee, Duvall, WA (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/833,883

(22) Filed: Dec. 6, 2017

(65) Prior Publication Data

US 2019/0174042 A1 Jun. 6, 2019

(51) Int. Cl.
| | |
|---|---|
| *H04N 5/232* | (2006.01) |
| *H04N 7/18* | (2006.01) |
| *B60Q 3/80* | (2017.01) |
| *B64D 11/00* | (2006.01) |
| *B60Q 3/74* | (2017.01) |
| *H05B 33/08* | (2020.01) |
| *H04N 5/235* | (2006.01) |
| *H04N 5/225* | (2006.01) |
| *B60Q 3/76* | (2017.01) |

(52) U.S. Cl.
CPC .............. *H04N 5/232* (2013.01); *B60Q 3/74* (2017.02); *B60Q 3/80* (2017.02); *B64D 11/00* (2013.01); *H04N 5/2256* (2013.01); *H04N 5/2354* (2013.01); *H04N 5/2357* (2013.01); *H04N 7/18* (2013.01); *H05B 33/0842* (2013.01); *H05B 33/0845* (2013.01); *B60Q 3/76* (2017.02); *B64D 2011/0038* (2013.01)

(58) Field of Classification Search
CPC . H04N 5/232; H04N 7/18; B60Q 3/80; B60Q 3/74; B60Q 3/76; B64D 11/00; B64D 2011/0038; H05B 33/0845
See application file for complete search history.

(56) References Cited

U.S. PATENT DOCUMENTS

| | | | | |
|---|---|---|---|---|
| 6,753,920 | B1 * | 6/2004 | Momose | H04N 5/235 |
| | | | | 348/364 |
| 9,743,010 | B1 * | 8/2017 | Edwards | H04N 5/2357 |
| 2006/0232825 | A1 * | 10/2006 | Freyman | G03B 15/03 |
| | | | | 358/296 |
| 2007/0139525 | A1 * | 6/2007 | Amphlett | H04N 5/222 |
| | | | | 348/207.99 |
| 2008/0044063 | A1 * | 2/2008 | Friedman | A61B 3/1216 |
| | | | | 382/117 |
| 2010/0254692 | A1 * | 10/2010 | Kurt | G03B 15/03 |
| | | | | 396/155 |

(Continued)

OTHER PUBLICATIONS

Extended European Search Report dated Feb. 21, 2019 for EP Patent Application No. 18209582.8.

*Primary Examiner* — Amy R Hsu
(74) *Attorney, Agent, or Firm* — Suiter Swantz pc llo

(57) ABSTRACT

A system, a camera, and a method. The system may include a light device and a camera. The light device may be configured to emit light having a lighting frequency defined by on states and off states of the light device. The camera may be in view of the emitted light. The camera may have an image acquisition frequency configured to capture all images during the on states of the light device.

11 Claims, 8 Drawing Sheets

(56) References Cited

U.S. PATENT DOCUMENTS

| | | | |
|---|---|---|---|
| 2012/0146066 A1* | 6/2012 | Tischler | H01L 27/156 257/89 |
| 2013/0033189 A1* | 2/2013 | Park | H05B 33/0845 315/209 R |
| 2013/0140467 A1* | 6/2013 | Kitano | H04N 5/37213 250/393 |
| 2014/0139130 A1* | 5/2014 | Upton | H05B 33/0845 315/209 R |
| 2014/0152841 A1* | 6/2014 | Rothenfusser | G01J 5/0003 348/164 |
| 2014/0198219 A1* | 7/2014 | Chuang | H04N 5/2354 348/164 |
| 2014/0320694 A1* | 10/2014 | Okuno | H04N 5/2351 348/229.1 |
| 2014/0362245 A1* | 12/2014 | Tachiwa | H04N 5/23206 348/211.2 |
| 2015/0271886 A1* | 9/2015 | Upton | H05B 33/0845 315/209 R |
| 2016/0073041 A1 | 3/2016 | Daalderop et al. | |
| 2016/0090196 A1* | 3/2016 | Besettes | B64C 1/1407 244/129.5 |
| 2016/0241765 A1 | 8/2016 | Walters et al. | |
| 2017/0244880 A1* | 8/2017 | Cope | B64D 47/08 |
| 2017/0343197 A1 | 11/2017 | Gammons et al. | |
| 2017/0372143 A1* | 12/2017 | Barcus | G06F 7/10 |

\* cited by examiner

SYNCHRONIZED CAMERA AND LIGHTING SYSTEM

BACKGROUND

Cameras are becoming more prevalent in aircraft to allow better visibility to cabin crew, enhance security, and protect airlines from out-of-context social media mobile phone video clips. Light emitting diodes (LEDs) are currently the preferred lighting choice for use in aircraft. LEDs are typically used in aircraft with light intensities less than 100% of the LEDs full intensity capability; such diminished light intensities are typically achieved by quickly pulsing the LEDs between on states (where the LEDs are powered) and off states (where the LEDs receive no power or less power than the on states) by utilizing pulse-width modulation (PWM) frequencies for the LEDs. Flashing of LEDs at the PWM frequencies is imperceptible to humans as the flashing of the LEDs occurs quicker than the flicker fusion frequency of human vision so that a consistently lit environment is perceived. Such flashing of the LEDs, however, can cause problems with cameras taking photos or video inside the aircraft cabin as the camera refresh rate can be out-of-synch with the LED flashes. Currently, camera systems onboard aircraft are susceptible to flicker artifacts, rolling shutter (e.g., aliasing), and black frames (e.g., where LEDs are off during image acquisition) caused by camera image acquisition capturing some images when the LEDs are in off states. Even worse, as the LEDs dim to a low percentage (e.g., in an on state for 10% a PWM cycle and then in an off state for 90% of the PWM cycle), the likelihood of acquiring an image while the LEDs are in an on state is low, despite the fact that human eyes may perceive constant light.

SUMMARY

In one aspect, embodiments of the inventive concepts disclosed herein are directed to a system. The system may include a light device and a camera. The light device may be configured to emit light having a lighting frequency defined by on states and off states of the light device. The camera may be in view of the emitted light. The camera may have an image acquisition frequency configured to capture all images during the on states of the light device.

In a further aspect, embodiments of the inventive concepts disclosed herein are directed to a camera. The camera may include an image sensor and a processor. The image sensor may be in view of emitted light from a light device, the emitted light having a lighting frequency defined by on states and off states of the light device. The image sensor may have an image acquisition frequency and may be configured to capture images. The processor may be communicatively coupled to the image sensor. The processor may be configured to control the image sensor such that the image sensor captures all images during the on states of the light device.

In a further aspect, embodiments of the inventive concepts disclosed herein are directed to a method. The method may include controlling, by a processor, an image sensor of a camera, the image sensor in view of emitted light from a light device, the emitted light having a lighting frequency defined by on states and off states of the light device, the image sensor having an image acquisition frequency. The method may also include capturing, by the image sensor of the camera, all images during the on states of the light device

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
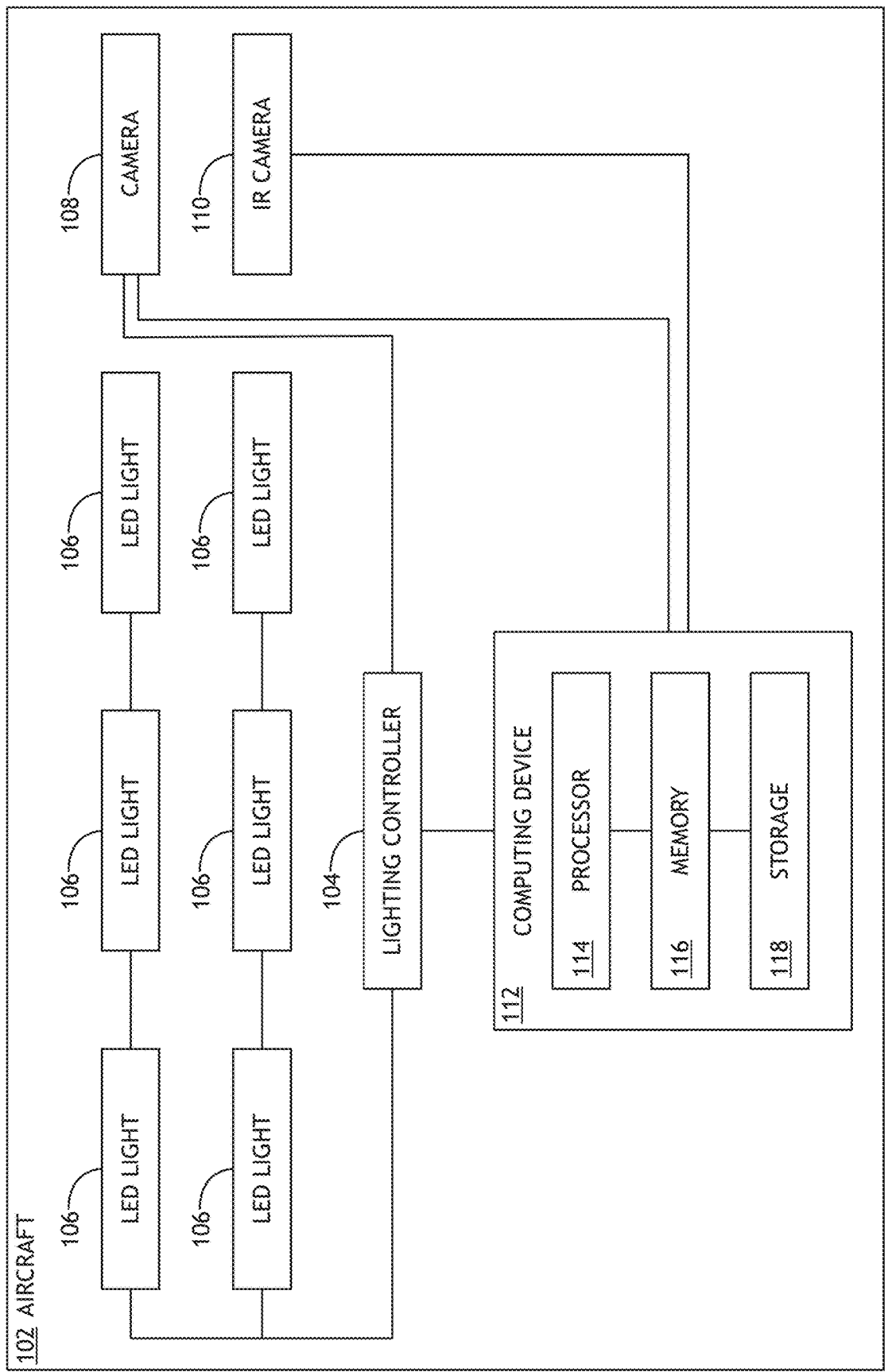
FIG. 1 is a view of an exemplary embodiment of an aircraft system implemented in an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system, apparatus, and method for synchronizing an image acquisition frequency and timing thereof of a camera with a lighting frequency and timing thereof of at least one light device so that the camera captures all images during on states of the at least one light device. For example, a lighting system (e.g., an aircraft cabin lighting system) may have the lighting system's pulse width modulation (PWM) frequency and timing synchronized (e.g., aligned) with a camera's image acquisition frequency and timing so that there are no flicker artifacts, rolling shutter (e.g., aliasing), or black frames (e.g., where light emitting diodes (LEDs) are off during image acquisition). Some embodiments may include a lighting controller sending a synch signal (e.g., a synch line) to a camera so as to cause the camera to acquire images during a leading edge of a PWM cycle when the lights are in an on state. Similarly, some embodiments may include a camera sending a synch signal (e.g., a synch line) to a lighting controller so as to cause lights to be in a leading edge of a PWM cycle (when the lights are in an on state) when the camera is scheduled to acquires images.

Embodiments may include connecting a camera with a lighting system to cause alignment with the camera's image acquisition and on states of light devices. In some embodiments, a lighting controller may output a synch signal to a camera to cause synchronization of light devices with the camera, while in other embodiments, the camera may output a synch signal to a lighting controller to cause synchronization of light devices with the camera. Embodiments may allow the camera to align the camera's frames with on states of light devices so as to avoid image flicker and other artifacts, and embodiments may maintain bright and clear images even when the environment appears dimly lit to humans because images are acquired during an on state portion (e.g., a leading on state edge) of a PWM flash. Due to such synchronization, an aircraft cabin may always be consistently and brightly lit during a camera's image acquisitions even when the cabin appears dimly lit to humans. Such synchronization can be performed with reading lights, ceiling lights, sidewall lights, and/or other feature lights to maintain a coherent, camera friendly environment. Additionally, some embodiments may include infrared (IR) LEDs configured to emit IR light and an IR camera configured to capture IR images to allow night vision of the cabin, such as when the cabin lighting is in night mode.

Additionally, in some embodiments, if a camera's image acquisition frequency is too slow (e.g., less than 100 Hertz (Hz)), a frequency multiplying method can be applied. For example, the camera can be configured to perform a synchronized image acquisition for one out of every two PWM flashes, one out of every three PWM flashes, one out of every four PWM flashes, etc. This keeps the frequency of the PWM flashes above the flicker fusion frequency of human vision and allows for the synchronization of an image acquisition frequency and timing thereof of a camera with a lighting frequency and timing thereof of a light device so that the camera captures all images during on states of the at least one light device, even though the image acquisition frequency is less than (e.g., ½ of, ⅓ of, ¼ of, . . . or 1/n of (where n is an integer)) the lighting frequency.

Referring now to FIGS. 1-4, an exemplary embodiment of a system (e.g., a vehicular system (e.g., an aircraft system)) implemented in a vehicle (e.g., an aircraft 102) according to the inventive concepts disclosed herein. While FIGS. 1-4 exemplarily depict an aircraft system implemented on the aircraft 102, some embodiments may be implemented as any suitable vehicular system (e.g., an automobile system, a train system, and/or a ship system) implemented in any suitable vehicle (e.g., an automobile, a train, and/or a ship).

The aircraft 102 may include at least one lighting controller 104, at least one light device (e.g., at least one LED light device 106), at least one camera 108, at least one IR camera 110, and at least one computing device, some or all of which may be communicatively coupled at any given time. While the aircraft 102 exemplarily includes elements as shown, in some embodiments, one or more of the elements of the aircraft 102 may be omitted, or the aircraft 102 may include other elements.

The light devices (e.g., the LED light devices 106, which may include LEDs) may be configured to emit light having a lighting frequency defined by on states and off states of the light devices. That is, the light devices may repeat cycles of being in an on state followed by being in an off state. In some embodiments, the lighting frequency is a PWM frequency. The lighting frequency may be adjustable, such as by the lighting controller 104, so as to cause lighting to appear dimmer or brighter to humans. In some embodiments, the light devices may have synchronized lighting frequencies such that the on states and off states are synchronized for all of the light devices. In some embodiments, the light devices may be controlled by the lighting controller 104. For example, the PWM frequency (e.g., so as to dim or brighten the perceived light) and a timing thereof (e.g., by shifting a phase of lighting cycles) may be controlled by the lighting controller 104. In some embodiments, some of the light devices may be implemented as IR light devices (e.g., IR LED light devices) and/or may include IR lights (e.g., IR LEDs). For example, the light devices may include LED light devices 106 and separate IR LED light devices. For example, light bars (or any other light assemblies, such as reading lights) may include the LED light devices 106 and the IR LED light devices, where each light bar is part of a red green blue white IR (RGBW(IR)) string such that the camera 108 and/or the camera 110 may be configured to capture images across the visible and IR spectrum.

Figure 2:
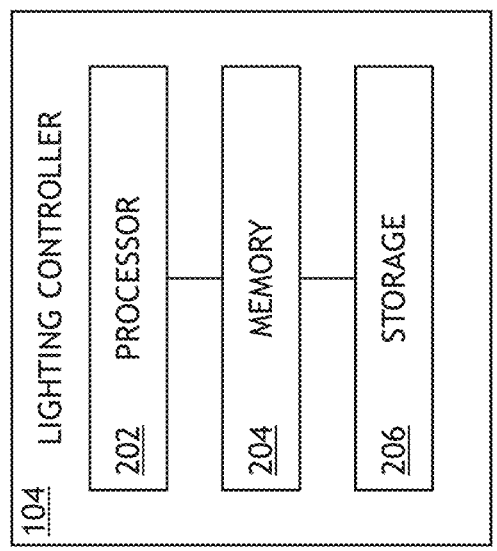
FIG. 2 is a view of the lighting controller of the aircraft of FIG. 1 according to the inventive concepts disclosed herein.

The lighting controller 104 may include at least one processor 202, memory 204, and at least one storage device 206, as well as other components, equipment, and/or devices commonly included in a computing device, some or all of which may be communicatively coupled at any given time, as shown in FIG. 2. The processor 202 may be implemented as any suitable processor, such as a general purpose processor, a field-programmable gate array (FPGA), and/or an image processor. For example, the lighting controller 104 may be configured to control the lighting frequency (e.g., so as to dim or brighten the perceived light) and a timing thereof (e.g., by shifting a phase of lighting cycles) of the light devices.

In some embodiments, the lighting controller 104 may be configured to obtain an image acquisition frequency and a timing (e.g., a phase at a point in time of the image acquisition cycle) thereof from the camera 108 and to synchronize the lighting frequency of the light devices with the image acquisition frequency of the camera 108 such that the camera 108 captures all images during the on states (e.g., during leading edges of the on states) of the light devices. The image acquisition frequency and the timing thereof may be obtained as a synch signal (e.g., a synch line).

In some embodiments, the lighting controller 104 may be configured to obtain and/or determine a lighting frequency and a timing (e.g., a phase at a point in time of the lighting cycle) thereof of the light devices and to output the lighting frequency and the timing thereof of the light devices to the camera 108. The lighting frequency and the timing thereof may be output as a synch signal (e.g., a synch line). As such, the camera 108 may be configured to receive the lighting frequency and the timing thereof from the lighting controller 104 and to synchronize the image acquisition frequency of the camera 108 with the lighting frequency such that the camera 108 captures all images during the on states (e.g., during leading edges of the on states) of the light devices.

In some embodiments, the lighting controller 104 may be configured to synchronize the lighting frequency with the image acquisition frequency by adjusting (e.g., increasing or decreasing) the lighting frequency to be the same as or an n (where n is an integer greater than or equal to 2) multiple of the image acquisition frequency and/or by adjusting a timing (e.g., by shifting a phase of the lighting cycle) of each lighting cycle.

The processor 202 may be configured to run various software applications or computer code stored (e.g., maintained) in a non-transitory computer-readable medium (e.g., memory 204 and/or storage 206) and configured to execute various instructions or operations. For example, the processor 202 may be configured to perform any or all of the operations of the lighting controller 104. The lighting controller 104 may be implemented as any suitable controller or computing device (e.g., 112). In some embodiments, the lighting controller 104 may be implemented as a cabin lighting controller. Additionally, for example, the lighting controller 104 and/or the processor 202 may be implemented as special purpose computers or special purpose processors configured (e.g., programmed) to execute instructions for performing any or all of the operations disclosed throughout. In some embodiments, the system of FIG. 1 may include any suitable number of lighting controllers 104. In some embodiments, the computing device 112 may be implemented as a lighting controller such that the lighting controller 104 may be omitted.

While the lighting controller 104 exemplarily includes elements as shown, in some embodiments, one or more of the elements of the lighting controller 104 may be omitted, or the lighting controller 104 may include other elements.

Figure 3:
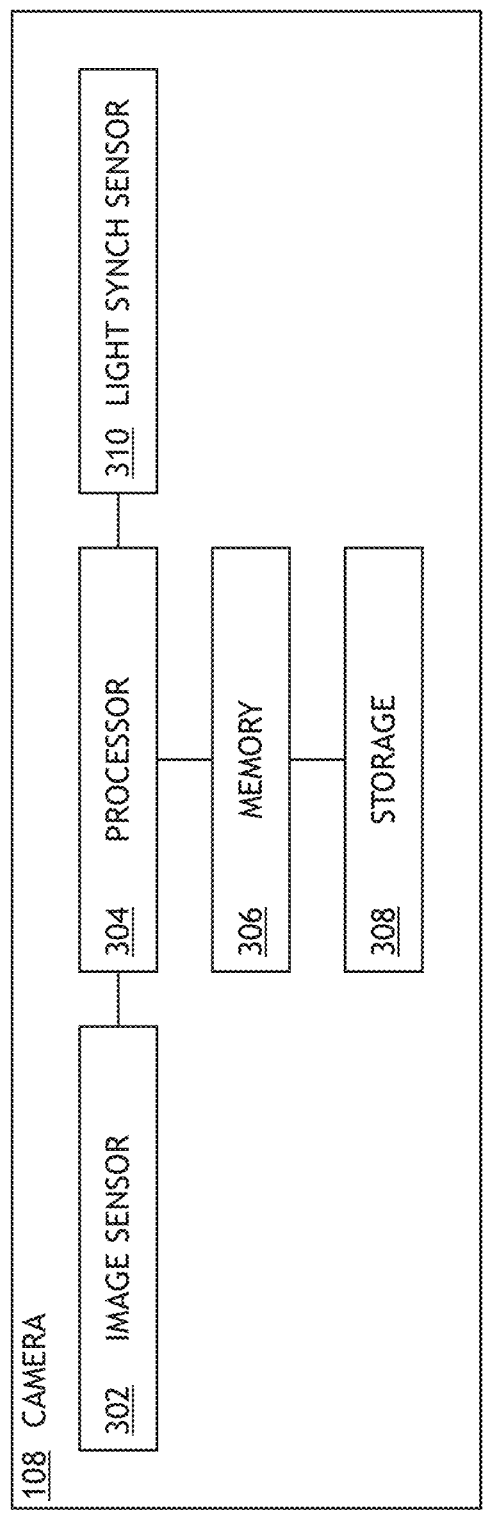
FIG. 3 is a view of the camera of the aircraft of FIG. 1 according to the inventive concepts disclosed herein.

The camera 108 (e.g., a digital camera) may include at least one image sensor 302, at least one processor 304, memory 306, at least one storage device 308, and at least one light synch sensor 310, as well as other components, equipment, and/or devices commonly included in a digital camera, some or all of which may be communicatively coupled at any given time, as shown in FIG. 3. The image sensor 302 may be implemented as any suitable image sensor. The processor 304 may be implemented as any suitable processor, such as a general purpose processor, a field-programmable gate array (FPGA), and/or an image processor. The camera 108 may be positioned in view of emitted light from the light devices. The camera 108 may have an image acquisition frequency, which may be configured to capture all images during the on states of the light devices. The image acquisition frequency may be adjustable, and the processor 304 may be configured to control the image acquisition frequency and a timing (e.g., e.g., a phase of the image acquisition cycle) thereof. For example, the processor 304 may be configured to shift a phase of the image acquisition cycle to change a timing. For example, the processor 304 may be configured to cause the image sensor to capture images. In some embodiments, the camera 108 may be configured to capture images in the visible spectrum and the IR spectrum; for example, the camera 108 may include the image sensor 302 and an IR image sensor (e.g., 402) or the image sensor 302 may be configured to capture images in the visible spectrum and the IR spectrum.

In some embodiments, the processor 304 may be configured to output an image acquisition frequency and a timing (e.g., a phase at a point in time of the image acquisition cycle) thereof to the lighting controller 104 such that the lighting controller 104 can synchronize the lighting frequency of the light devices with the image acquisition frequency of the camera 108 so that the camera 108 captures all images during the on states (e.g., during leading edges of the on states) of the light devices. The image acquisition frequency and the timing thereof may be output as a synch signal (e.g., a synch line).

In some embodiments, the processor 304 may be configured to obtain (e.g., receive) a lighting frequency and a timing (e.g., a phase at a point in time of the lighting cycle) thereof of the light devices from the lighting controller 104 and synchronize the image acquisition frequency with the lighting frequency such that the camera 108 captures all images during the on states of the light devices. The lighting frequency and the timing thereof may be obtained as a synch signal (e.g., a synch line).

In some embodiments, the processor 304 may be configured to obtain and/or determine a lighting frequency and a timing (e.g., a phase at a point in time of the lighting cycle) thereof of the light devices. For example, the processor 304 may be configured to obtain and/or determine a lighting frequency and a timing thereof based on data received from the light synch sensor 310, which may be configured to detect the lighting frequency and the timing thereof. Based on the lighting frequency and the timing thereof, the processor may be configured to synchronize the image acquisition frequency with the lighting frequency such that the camera 108 captures all images during the on states (e.g., during leading edges of the on states) of the light devices.

In some embodiments, the image acquisition frequency may be an initial image acquisition frequency. The processor 304 may be configured to determine that the lighting frequency of the light devices is less than the initial image acquisition frequency, to reduce a frequency of the initial image acquisition frequency to a second image acquisition frequency, and to synchronize the second image acquisition frequency with the lighting frequency such that the camera 108 captures all images during the on states (e.g., during leading edges of the on states) of the light devices.

In some embodiments, the processor 304 may be configured to synchronize the image acquisition frequency with the lighting frequency by adjusting (e.g., increasing or decreasing) the image acquisition frequency to be the same as or a 1/n multiple of the lighting frequency and/or by adjusting a timing (e.g., by shifting a phase of the image acquisition cycle) of each image acquisition cycle.

The processor 304 may be configured to run various software applications or computer code stored (e.g., maintained) in a non-transitory computer-readable medium (e.g., memory 306 and/or storage 308) and configured to execute various instructions or operations. For example, the processor 304 may be configured to perform any or all of the operations of the camera 108. Additionally, for example, the processor 304 may be implemented as a special purpose processor configured (e.g., programmed) to execute instructions for performing any or all of the operations disclosed throughout. In some embodiments, the system of FIG. 1 may include any suitable number of cameras 108. In some embodiments, the processor 114 of the computing device 112 may be configured to perform, at least in part, the functionality of the processor 304.

The light synch sensor 310 may be configured to detect the lighting frequency and the timing thereof. In some embodiments, the light synch sensor 310 may include a processor (e.g., a controller (e.g., a microcontroller)) configured to measure the lighting frequency (e.g., a PWM frequency) and the timing thereof of sensed light such that the light synch sensor 310 can determine the lighting frequency and the timing thereof without being communicatively coupled to the lighting controller 104 (if the system includes a lighting controller). In some embodiments, the light synch sensor 310 may be configured to measure the lighting frequency and the timing thereof for visible light and/or IR light. The light synch sensor 310 may be communicatively coupled to the processor 304 of the camera 108 and configured to output detected (e.g., measured) lighting frequency and the timing thereof to the processor 304 of the camera 108. In some embodiments, the light synch sensor 310 is implemented in or on the camera 108; however, in some embodiments, the light synch sensor 310 may be implemented at any suitable position in a system (e.g., in a vehicle cabin) where the light synch sensor 310 is in view of light emitted from the light devices. For example, the light synch sensor 310 may be implemented separately from the camera 108.

In some embodiments, a processor (e.g., the processor 304 and/or a controller of the light synch sensor 310) may be configured to execute software such that the processor is configured to determine an appropriate operating mode of a plurality of operating modes (e.g., bright operating mode, medium operating mode, and dim operating mode) for the camera 108, such as by locking on all light flashes (e.g., LED light flashes), locking on alternating light flashes, or recurrently locking on one of a series of light flashes (e.g., one of every n light flashes). As such, in some embodiments, the camera 108 may be retrofitted, without modifying or replacing legacy lighting systems, so as to achieve a synchronized camera and lighting system.

While the camera 108 exemplarily includes elements as shown, in some embodiments, one or more of the elements of the camera 108 may be omitted, or the camera 108 may include other elements.

Figure 4:
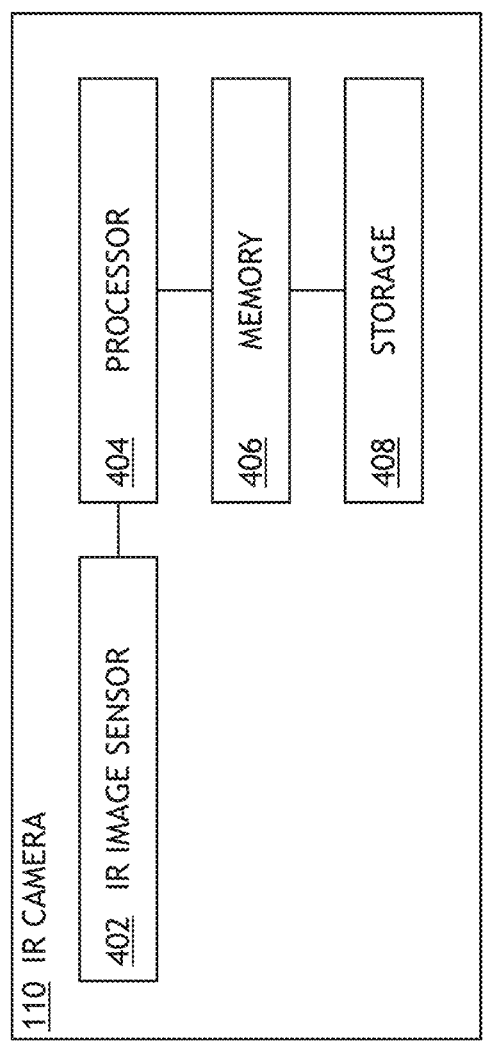
FIG. 4 is a view of the infrared camera of the aircraft of FIG. 1 according to the inventive concepts disclosed herein.

The IR camera 110 (e.g., a digital IR camera) may include at least one IR image sensor 402, at least one processor 404, memory 406, at least one storage device 408, and at least one light synch sensor (not shown), as well as other components, equipment, and/or devices commonly included in a digital IR camera, some or all of which may be communicatively coupled at any given time, as shown in FIG. 4. The image sensor 302 may be implemented as any suitable IR image sensor. The IR camera 110 may be implemented similarly as and have functionality similarly to the camera 108, except that the IR camera 110 is configured to capture IR images. For example, similar to the camera 108, an IR image acquisition frequency of the IR camera 110 may be synchronized with an IR lighting frequency of IR light devices such that the camera 110 captures all IR images during the on states (e.g., during leading edges of the on states) of the IR light devices. Additionally, for example, the IR camera 110 may be configured to capture IR images when the lighting frequency of the light devices is less than the image acquisition frequency.

While the IR camera 110 exemplarily includes elements as shown, in some embodiments, one or more of the elements of the IR camera 110 may be omitted, or the IR camera 110 may include other elements.

In some embodiments, the IR camera 110 may be omitted. For example, the camera 108 may be configured to sense light in the IR spectrum and capture IR images. For example, the camera 108 may have sensitivity to IR light and be configured to capture black and white images based on sensed IR light.

The computing device 112 may include at least one processor 114, at least one memory 116, and at least one storage device 118, as well as other components, equipment, and/or devices commonly included in a computing device, some or all of which may be communicatively coupled. The processor 114 may be implemented as any suitable processor, such as a general purpose processor, an FPGA, and/or an image processor. For example, the computing device 112 may be configured to control the lighting controller 104, the camera 108, and the IR camera 110. For example, the processor 114 may be configured to receive user input data to change a dimness or a brightness of the light devices, and the processor 114 may output an instruction to the lighting controller 104 to change the dimness or brightness of the light devices. Likewise, the lighting controller 104 and/or the camera 108 may respond such that the lighting frequency and the image acquisition frequency remain aligned, such as disclosed throughout. The processor 114 may be configured to run various software applications or computer code stored (e.g., maintained) in a non-transitory computer-readable medium (e.g., memory 116 and/or storage 118) and configured to execute various instructions or operations. The computing device 112 may be implemented as any suitable computing device. In some embodiments, the computing device 112 is implemented as a vetronics computing device (e.g., an avionics computing device) in a vehicle, such as the aircraft 102, an automobile, or a train. Additionally, for example, the computing device 112 or the processor 114 may be implemented as special purpose computers or special purpose processors configured (e.g., programmed) to execute instructions for performing any or all of the operations disclosed throughout. In some embodiments, the system of FIG. 1 may include any suitable number of computing devices 112.

While the computing device 112 exemplarily includes elements as shown, in some embodiments, one or more of the elements of the computing device 112 may be omitted, or the computing device 112 may include other elements.

Figure 5:
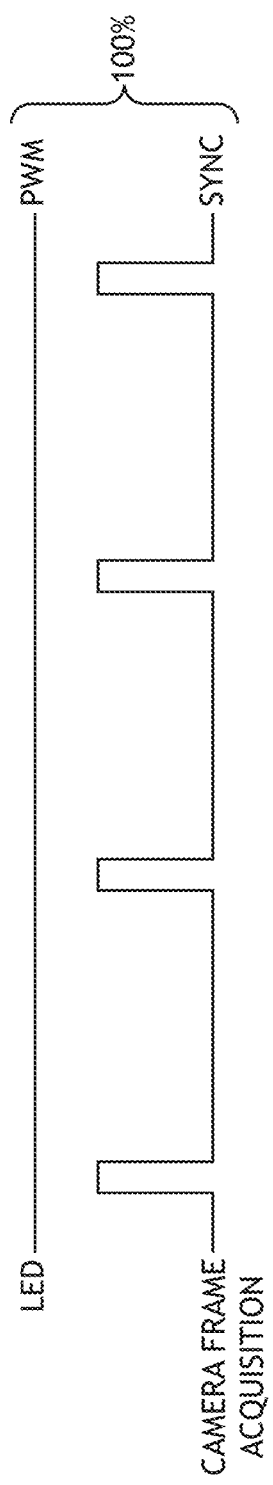
FIG. 5 is an exemplary graph of an LED lighting cycle at 100% LED power output compared to image acquisition cycles of a camera.

Referring now to FIG. 5, an exemplary graph of an LED lighting cycle at 100% LED power output compared to image acquisition cycles (e.g., camera frame acquisition cycles) of a camera is shown. As shown in FIG. 5, the LED is at 100% power output such that the LED is always in an on state. The image acquisitions (as shown by peaks in FIG. 5) occur while the LED is in an on state such that the camera captures all images during an on state of the LED.

Figure 6:
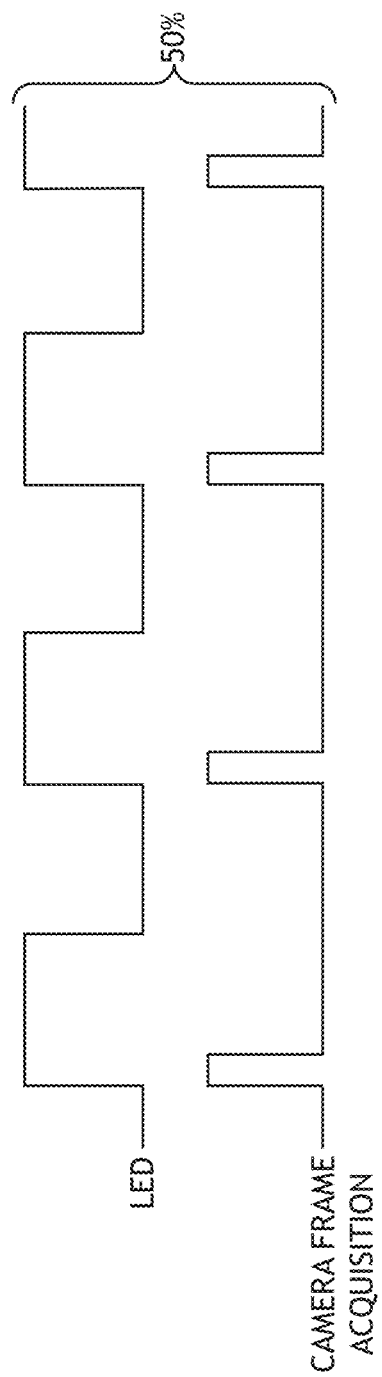
FIG. 6 is an exemplary graph of LED lighting cycles at 50% LED power output compared to image acquisition cycles of a camera, according to inventive concepts disclosed herein.

Referring now to FIG. 6, an exemplary graph of LED lighting cycles at 50% LED power output compared to image acquisition cycles (e.g., camera frame acquisition cycles) of a camera, according to inventive concepts disclosed herein, is shown. As shown in FIG. 6, the LED is at 50% power output such that the LED is operating half the time in on states during the peaks and operating half the time in off states during the valleys. The image acquisition frequency is aligned with the light frequencies such that the image acquisitions (as shown by peaks in FIG. 6) occur during the leading edge of the on state of each LED lighting cycle. Each image acquisition occurs while the LED is in an on state such that the camera captures all images during on states of the LED so as to avoid flicker and other artifacts. An advantage of synchronizing the image acquisitions to being aligned with leading edges of on states of the LED may be that the image acquisition remains synchronized with the on states of the light devices even if a duration of each on state is reduced (e.g., so as to dim the light devices).

Figure 7:
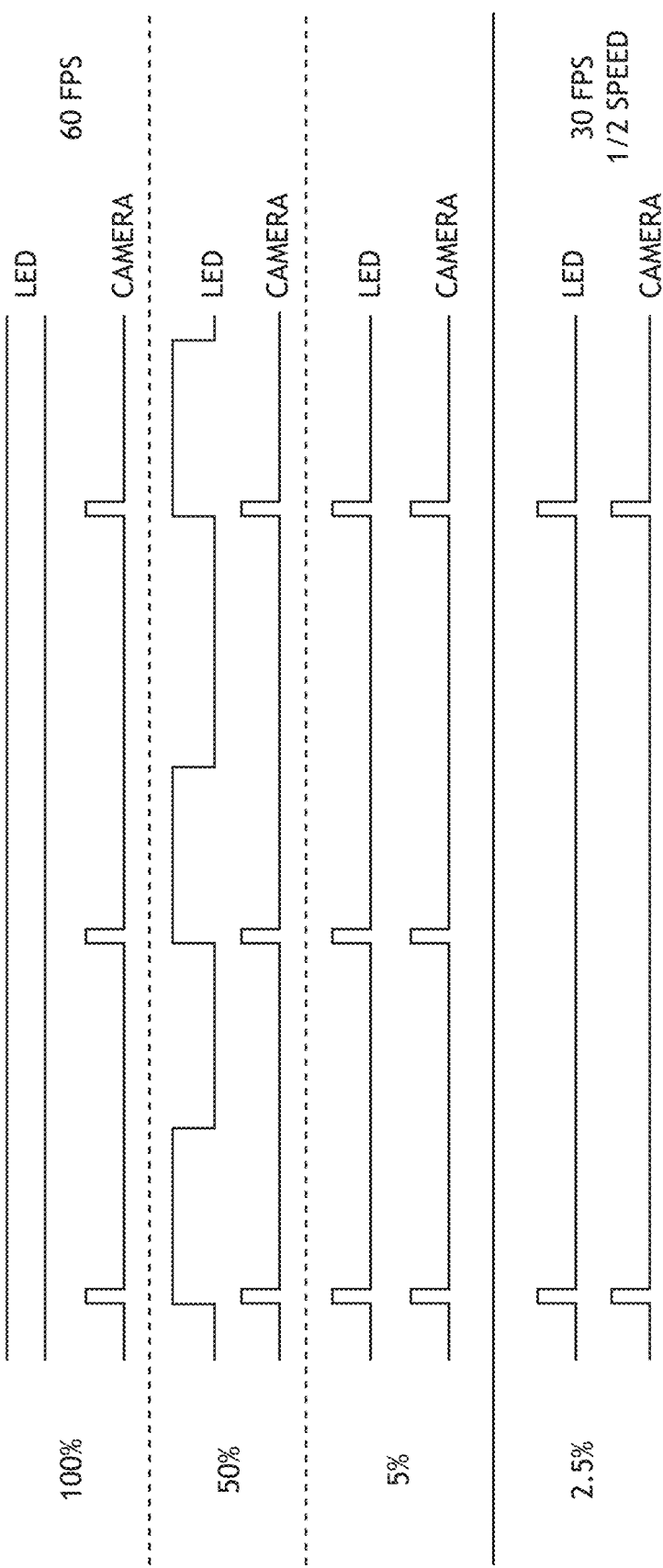
FIG. 7 is exemplary overlaid graphs of LED lighting cycles at various LED power outputs compared to various image acquisition cycles of a camera, according to inventive concepts disclosed herein.

Referring now to FIG. 7, exemplary overlaid graphs of LED lighting cycles at various LED power outputs compared to various image acquisition cycles of a camera, according to inventive concepts disclosed herein, are shown. The top graph shows an LED lighting cycle at 100% LED power output compared to image acquisition cycles of a camera configured for capturing 60 frames per second, similar to FIG. 5. The second graph shows LED lighting cycles at 50% LED power output compared to image acquisition cycles of a camera configured for capturing 60 frames per second, similar to FIG. 6. The third graph shows LED lighting cycles at 5% LED power output compared to image acquisition cycles of a camera configured for capturing 60 frames per second. The fourth graph shows LED lighting cycles at 2.5% LED power output compared to image acquisition cycles of a camera configured for capturing 30 frames per second. With respect to the fourth graph, as the LED dims to a low level and approaches the camera's image acquisition duration, the mode of the LED system may changes from a PWM mode to a pulse-frequency modulation (PFM) mode, which lengthens the lighting cycle (by increasing the amount of time between on states) to achieve a lower dim level while still allowing each image acquisition to fully occur during an on state of the LED. For second, third, and fourth graphs, the image acquisition frequency is aligned with the lighting frequency such that the image acquisitions (as shown by peaks in FIG. 6) occur during the leading edge of the on state of each LED lighting cycle.

Figure 8:
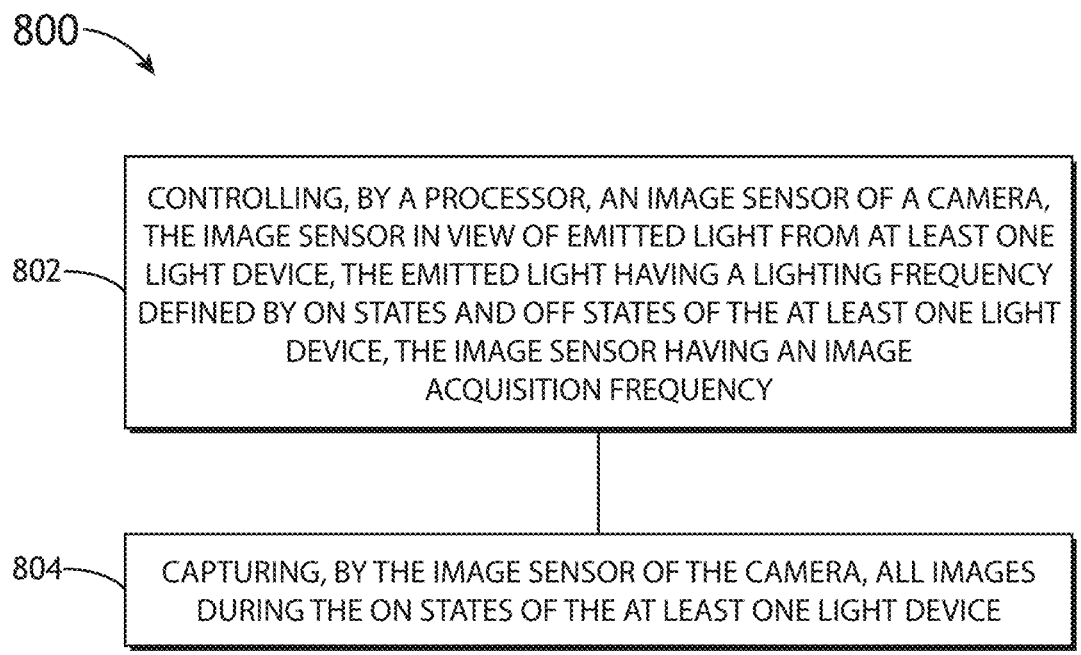
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one more instances of the method 800 iteratively, concurrently, and/or sequentially.

A step 802 may include controlling, by a processor, an image sensor of a camera, the image sensor in view of emitted light from at least one light device, the emitted light having a lighting frequency defined by on states and off states of the at least one light device, the image sensor having an image acquisition frequency.

A step 804 may include capturing, by the image sensor of the camera, all images during the on states of the at least one light device.

Further, the method 800 may include any of the operations disclosed throughout.

As will be appreciated from the above, embodiments of the inventive concepts disclosed herein may be directed to a method, a lighting system, and a camera, wherein the lighting system is synchronized with the camera such that the camera captures all images during on states of the lighting system.

As used throughout and as would be appreciated by those skilled in the art, "at least one non-transitory computer-readable medium" may refer to as at least one non-transitory computer-readable medium (e.g., memory 116, memory 204, memory 306, memory 406, storage 118, storage 206, storage 308, storage 408, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one light device configured to emit light having a lighting frequency defined by on states and off states of the at least one light device, wherein the at least one light device is a plurality of light devices having synchronized lighting frequencies such that the on states and off states are synchronized for all of the plurality of light devices;
   a camera in view of the emitted light, the camera having an image acquisition frequency configured to capture all images during leading edges of the on states of the at least one light device;
   a lighting controller communicatively coupled to the at least one light device and the camera, the lighting controller configured to:
      control the lighting frequency and a timing thereof of the at least one light device; and
      output the lighting frequency and a timing thereof of the at least one light device to the camera; and
   an infrared sensor configured to capture images when the lighting frequency of the at least one light device is less than the image acquisition frequency,
   wherein the image acquisition frequency is 1/n of the lighting frequency, wherein n is an integer greater than or equal to 2, wherein the camera captures an image in one of every n on states of the at least one light device,
   wherein the camera is configured to receive the lighting frequency and the timing thereof from the lighting controller and synchronize the image acquisition frequency with the lighting frequency such that the camera captures all images during the leading edges of the on states of the at least one light device,
   wherein the system is an aircraft system, wherein the at least one light device and the camera are implemented in an aircraft.

2. The system of claim 1, wherein the lighting controller is further configured to:
   obtain the image acquisition frequency and a timing thereof from the camera; and
   synchronize the lighting frequency of the at least one light device with the image acquisition frequency of the camera such that the camera captures all images during the leading edges of the on states of the at least one light device.

3. The system of claim 1, wherein the camera is further configured to:
   detect the lighting frequency and a timing thereof of the at least one light device; and
   synchronize the image acquisition frequency with the lighting frequency such that the camera captures all images during the leading edges of the on states of the at least one light device.

4. The system of claim 1, wherein the image acquisition frequency is an initial image acquisition frequency, wherein the camera is further configured to:
   determine that the lighting frequency of the at least one light device is less than the initial image acquisition frequency;
   reducing a frequency of the initial image acquisition frequency to a second image acquisition frequency; and
   synchronize the second image acquisition frequency with the lighting frequency such that the camera captures all images during the leading edges of the on states of the at least one light device.

5. The system of claim 1, wherein the lighting frequency is a pulse-width modulation (PWM) frequency.

6. The system of claim 1, wherein the image acquisition frequency and the lighting frequency are adjustable.

7. The system of claim 1, wherein the at least one light device is at least one light emitting diode (LED) device.

8. A system, comprising:
   at least one light device configured to emit light having a lighting frequency defined by on states and off states of the at least one light device, wherein the at least one light device is a plurality of light devices having synchronized lighting frequencies such that the on states and off states are synchronized for all of the plurality of light devices;
   a camera in view of the emitted light, the camera having an image acquisition frequency configured to: capture all images during leading edges of the on states of the at least one light device; determine the lighting frequency and a timing thereof of the at least one light device; and synchronize the image acquisition frequency with the lighting frequency such that the camera captures all images during the leading edges of the on states of the at least one light device; and
   an infrared sensor configured to capture images when the lighting frequency of the at least one light device is less than the image acquisition frequency,
   wherein the image acquisition frequency is 1/n of the lighting frequency, wherein n is an integer greater than or equal to 2, wherein the camera captures an image in one of every n on states of the at least one light device,
   wherein the system is an aircraft system, wherein the at least one light device and the camera are implemented in an aircraft.

9. The system of claim 8, wherein the lighting frequency is a pulse-width modulation (PWM) frequency.

10. The system of claim 8, wherein the image acquisition frequency and the lighting frequency are adjustable.

11. The system of claim 8, wherein the at least one light device is at least one light emitting diode (LED) device.

* * * * *